UNITED STATES PATENT OFFICE.

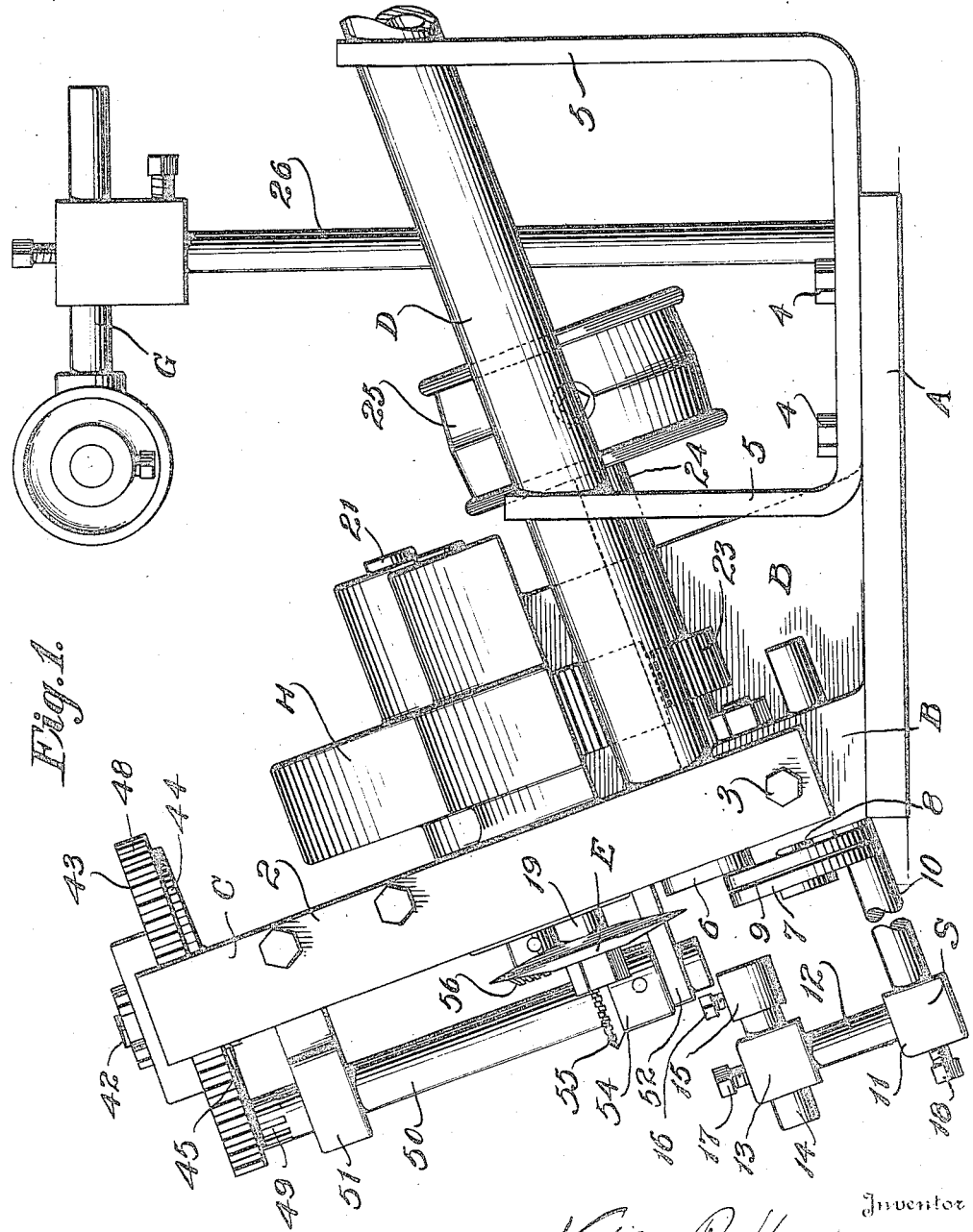

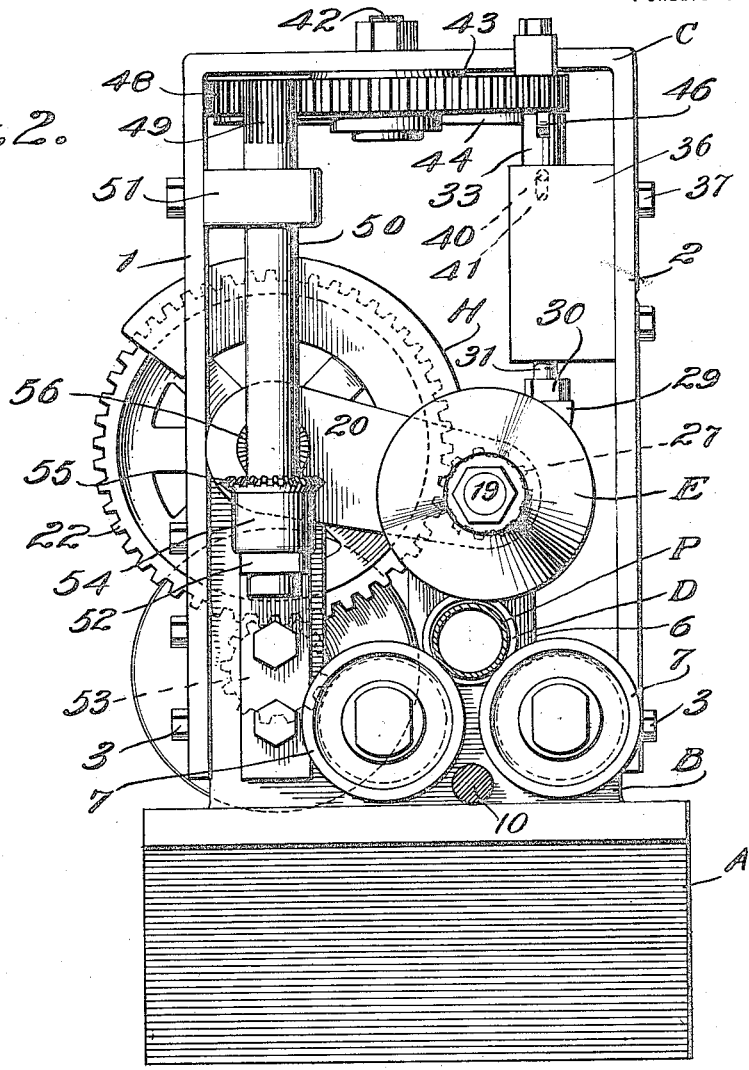

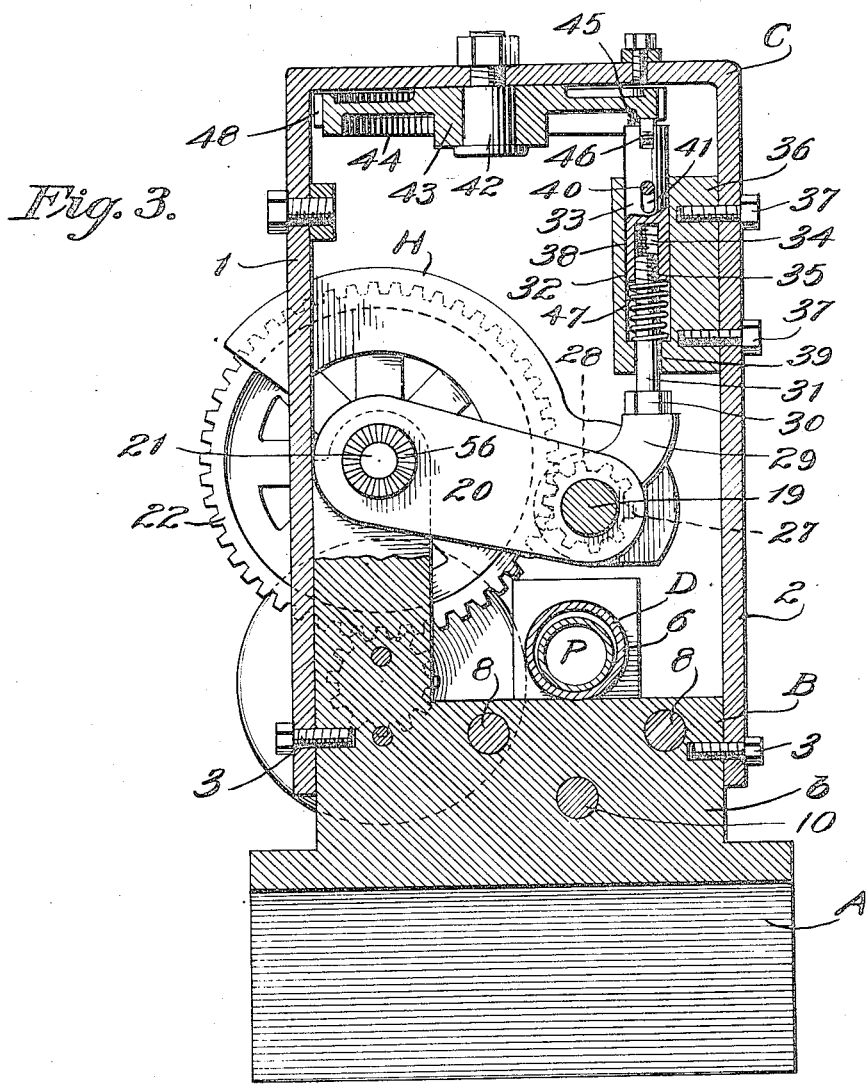

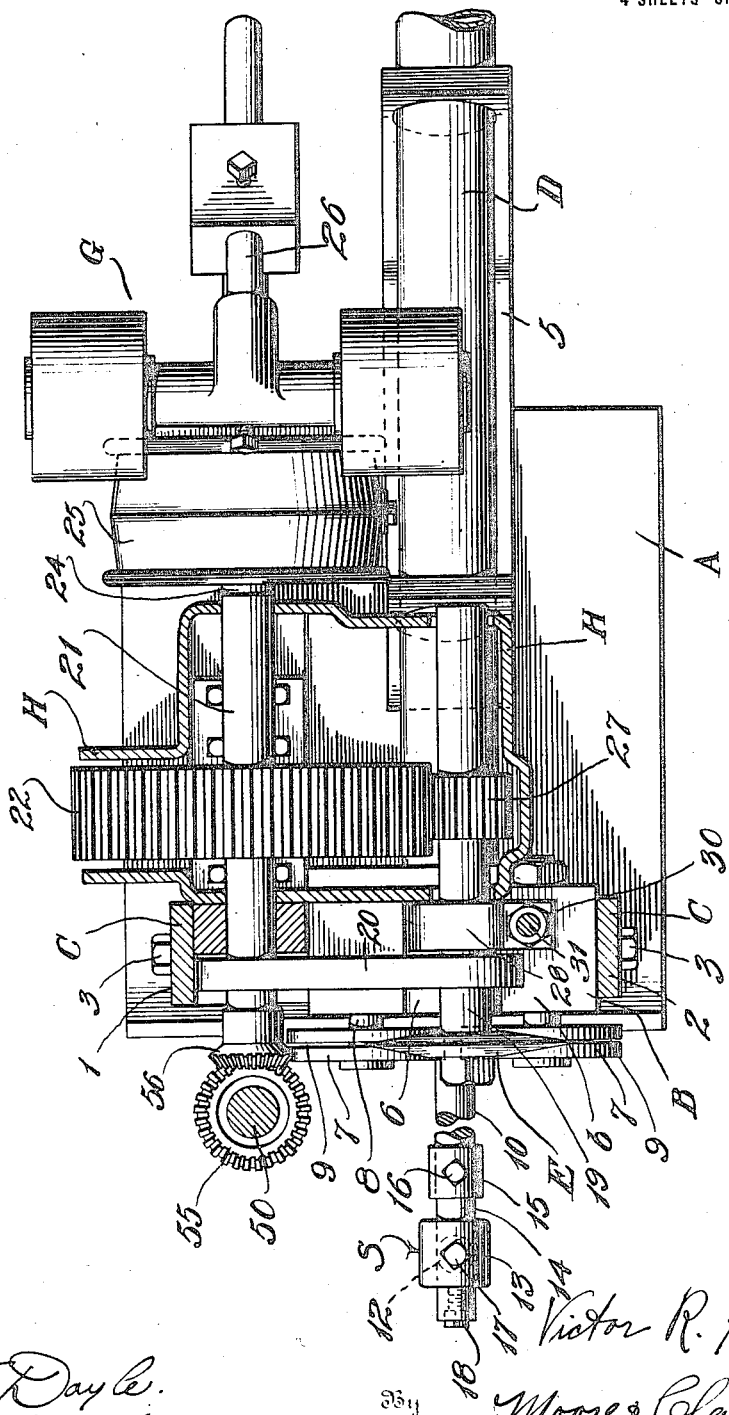

VICTOR R. KOONTZ, OF WAYNESBORO, PENNSYLVANIA.

AUTOMATIC PIPE-CUTTING MACHINE.

1,212,507.  Specification of Letters Patent.  Patented Jan. 16, 1917.

Application filed July 13, 1914. Serial No. 850,715.

*To all whom it may concern:*

Be it known that I, VICTOR R. KOONTZ, citizen of the United States, residing at Waynesboro, in the county of Franklin and State of Pennsylvania, have invented certain new and useful Improvements in Automatic Pipe-Cutting Machines, of which the following is a specification.

This invention relates to a machine for cutting tubes, bars and similar articles into sections of predetermined lengths, and in the present instance I show and describe a machine adapted especially for cutting pipe, although I wish it to be understood that the invention is not limited in its useful application to this particular purpose.

In carrying out my invention it is my purpose to provide a machine wherein the stock pipe to be cut is fed by gravity into position relative to the cutter, and the latter is, in turn, automatically operated to bring it into cutting operation with the pipe to sever a section of predetermined length. After the section of pipe has been completely severed the cutter is automatically moved away from the pipe.

Another object of the invention is the provision of a machine having a guide along which the stock pipe is fed by gravity into cutting position, this guide being capable of adjustment to different angles to vary the feed of the pipe.

It is also my purpose to provide a machine employing a rotary cutter which is automatically moved into and out of cutting relation with the stock pipe by mechanism operating in unison with the mechanism which imparts the rotary movement to the cutter.

A further object of the invention is to provide a machine embodying in its construction the desired features of simplicity, efficiency and economy and through the agency of which a pipe may be rapidly and accurately cut into sections of predetermined length without requiring the constant attention of an operator.

With the above recited objects and others of a similar nature in view, my invention consists in the construction, combination and arrangement of parts set forth in and falling within the scope of the appended claims.

In the accompanying drawings: Figure 1 is a view in side elevation of a machine embodying my invention. Fig. 2 is a view in front elevation, the pipe stop being omitted. Fig. 3 is a vertical longitudinal sectional view taken through the machine. Fig. 4 is a top plan view with the gear housing omitted.

Before entering into the detail description of my invention I will briefly state that the preferred form of machine shown herein embraces among other features an inclined pipe guide down which the pipe passes until its forward end contacts with a pipe stop, preferably located at the extreme forward end of the machine. The cutter is in the nature of a rotary disk which is carried by a rocker arm, so that when said arm is depressed, through mechanism hereinafter described, the cutter will be brought into contact with the pipe at the point where the cut is to be made, and a section of predetermined length will be severed by the action of the rotary cutter. As soon as the cutting action is completed the rocker arm is automatically elevated to move the cutter away from the pipe, and the entire length of the pipe again moves down the inclined guide by gravity, and into position to have another section cut therefrom.

Referring now to the accompanying drawings in detail, the letter A indicates the bed or base of the machine, preferably having cast integral therewith the angular block or post B which forms a support for certain shafts and other parts of the machine as will be hereinafter apparent.

The letter C designates a frame, the approximately vertical arms 1 and 2 of which are bolted at their lower ends to the forward portion of the block B, as indicated at 3. Fastened adjacent the rear of the bed by any suitable means, such as the bolts 4, is a U-shaped frame 5 which constitutes a support or bearing for the pipe guide D, this pipe guide being inclined downwardly from the rear toward the front of the machine, the forward end 6 of the guide resting upon the front wall $b$ of the block B. In the present instance, I have shown this guide in the form of a cylindrical tube, but it will be of course understood that it may be of any suitable shape or form. The stock pipe to be cut is shown at P, and as it is fed down the pipe guide by gravity and emerges at the forward end 6 of the guide it contacts with and rests upon the pair of bearing rollers 7—7, the shafts 8—8 of which find bearings in the front wall $b$ of the block B. These rollers 7—7 are slotted peripherally, as at 9—9, to accommodate the cutter of the machine. As the pipe P passes over the rollers 7—7 its forward end contacts with a stop indicated as an entirety by the letter S. This stop S, which may be of any preferred character, in the present instance, comprises a horizontally inclined bar 10 carried by and extending forward of the wall b of the block B, the forward end of the bar terminating in the coupling 11 which carries the short vertically inclined post 12, the upper end of this post supports a head block 13 in which is adjustably mounted the shank 14 carrying the head 15 against which the ends of the pipe P is adapted to abut. The head 15 is connected with the shank by the set screw 16, while 17 is a set screw for fastening the shank in the head block 13 and 18 is a similar set screw for securing the post 12 in the coupling 11. By this arrangement it will be seen that the various parts of the complete stop may be adjusted to suit the work at hand.

The cutter of the machine is shown at E and in the preferred form is a circular rotary, cutter disk which is so mounted and arranged that it will describe a cutting path substantially at right angles to the pipe guide and consequently the pipe to be cut, so that the cut will be straight through the pipe at right angles to its longitudinal axis. This cutter disk is carried at the front end of the shaft 19 so that the disk in its reciprocating movement will travel in a path directly over the rollers 7—7. The cutter shaft 19 is rotatably mounted in the forward end of the rocker arm 20, the latter being mounted to rock upon the shaft 21 which is journaled in the block B and is driven from the gear wheel 22 which in turn meshes with, and is driven by the gear pinion 23 on the power shaft 24. This shaft 24 carries the belt pulley 25 for the drive belt (not shown), and which belt may be trained over the belt guide G mounted on the post 26 fastened to the bed of the machine adjacent the rear thereof. As the belt guide G may be of any suitable form, it is unnecessary to describe the same further in detail. Carried by the cutter shaft 19 is a gear pinion 27 which meshes with the gear wheel 22, so it will be seen that a rotary movement is imparted to the rotary cutter disk E through the power shaft 24, pinion 23, intermediate gear wheel 22 and pinion 27.

In order to lower and raise the cutter disk into and out of cutting position relative to the pipe P, I employ the following mechanism: Loosely surrounding the shaft 19 is a collar 28 having an arm 29 to the upper end of which is adjustably connected, by means of a nut 30, a rod 31 which forms one section of the plunger 32, the other section of the plunger comprising the rod 33 having a threaded socket 34 in the lower portion thereof into which socket is screwed the threaded upper end 35 of the rod 31. The numeral 36 indicates a block secured by bolts 37 to the side 2 of the frame C, and this block is formed with a vertical socket 38 terminating at its lower end in the bore 39 through which the rod 31 passes. The plunger is adapted to have a limited movement up and down in the block 36, the travel of the plunger being limited by the cross pin 40 which passes through the vertical elongated slot 41 in the rod section 33 of the plunger. Carried by the cross bar of the frame C is the shaft 42 of the cam wheel 43. The under side of this wheel is formed with a circular cam flange 44 having the usual shoulder 45. Carried at the upper end of the plunger 32 is a bearing roller 46 which is normally held in contact with the circular cam by means of the spring 47 located in the socket 38 of the block 36 and bearing at one end against the bottom of the socket and at its other end against the bottom of the rod section 33. The cam wheel 43 is provided with the gear teeth 48 which mesh with the fluted end 49 of the vertical shaft 50, the upper portion of which passes through the bearing 51 while the lower end of the shaft projects through an opening in the lateral end 52 of the bracket 53 which is bolted to the block B. Fast with the lower portion of the shaft above the bracket is a collar 54 carrying the beveled gear 55 which meshes with a beveled gear 56 fast on the shaft 21. From this it will be seen that when the shaft 21 is rotated, as before described motion will be imparted through the beveled gears 56 and 55 to the vertical shaft 50, which in turn will rotate the cam wheel 43, and the circular cam of the wheel bearing against the roller 46 of the plunger 32 will force the plunger downward against the action of the spring 47, and consequently depress the cutter disk into contact with the pipe. When the roller 46 reaches the highest point of the circular cam and drops over the shoulder 45 to the lowest point thereof, assisted by the spring 47, the upward movement of the plunger will lift the cutter back out of cutting position.

If desired, the driving gears of a machine may be provided with a suitable protective housing or casing such as shown at H.

From the above description taken in connection with the accompanying drawings, the construction and operation of my machine will be readily apparent. The pipe guide D having been adjusted or tilted to the proper angle, the pipe P is inserted and drops down the guide by gravity until its lower end strikes the pipe stop, the latter having been properly adjusted to suit the work at hand. The machine is now started by imparting power to the power or drive shaft 24, and as the cam wheel turns the cutter and the rocker arm are depressed by the downward movement of the plunger until the cutting disk contacts with the pipe. At the same time the train of gearing which imparts the rotary movement to the cutter is in operation, and the cutting of the pipe takes place. It will be seen that the peripheral grooves in the bearing rollers 7—7 will accommodate the cutting edge of the cutter disk so that the section of pipe may be completely severed. After the section of pipe has been cut, which occurs when the cam wheel has made one complete revolution, the cutter is elevated away from the pipe, as before described, and the entire length of pipe is again fed down the pipe guide in position for cutting another section.

While I have herein shown and described one particular embodiment of my invention I wish it to be understood that I do not confine myself to all the precise details of construction herein set forth by way of illustration, as modification and variation may be made without departing from the spirit of the invention or exceeding the scope of the appended claims.

What I claim is:—

1. The combination with an inclined pipe guide along which the pipe is fed by gravity into cutting position, of a rotary cutter arranged substantially at right angles to the guide, a stop for the forward end of the pipe, means for raising and lowering the cutter to and from the pipe, and means for imparting rotary movement to the cutter.

2. The combination with means for supporting the pipe to be cut, of cutter mechanism, and means for bodily moving the cutter mechanism to and from a pipe, said means including a cam wheel, a plunger connected with the cutter and bearing at one end against the cam wheel, and mechanism for driving the cam wheel.

3. The combination with a support for a pipe to be cut, of means for holding the pipe in cutting position, a rotary cutter, a cutter shaft, a rocker arm connected with the cutter shaft, a shaft carrying the rocker arm, a gear wheel on said shaft, a gear pinion on the cutter shaft meshing with the gear wheel and driven therefrom, a drive shaft, and a pinion on the drive shaft meshing with and imparting motion to the gear wheel.

4. The combination of a support for a pipe, means for holding the pipe in position to be cut, a rotary cutter, a shaft carrying the cutter, a pivotally mounted rocker arm supporting said shaft, a plunger connected to said arm, and means for reciprocating said plunger.

5. The combination of a support for a pipe, means for holding the pipe in position to be cut, a rotary cutter, a shaft carrying the cutter, a pivotally mounted rocker arm supporting the cutter shaft, a shaft carrying the rocker arm, a gear wheel on the last named shaft, a pinion on the cutter shaft meshing with the wheel and driven therefrom, a drive shaft, a pinion on the drive shaft to rotate the gear wheel, a plunger connected to the rocker arm, means comprising a cam to reciprocate the plunger, and connections for operating the cam from the shaft carrying the gear wheel.

In testimony whereof I affix my signature in presence of two witnesses.

VICTOR R. KOONTZ.

Witnesses:
   Chas. T. Koons,
   K. Hasper Washabaugh.